United States Patent
Witzke et al.

[11] 3,955,879
[45] May 11, 1976

[54] NONLINEAR ELECTROCHROMIC DEVICE

[75] Inventors: Horst Witzke, Princeton; Matthew D. Miller, Cranbury, both of N.J.

[73] Assignee: Optel Corporation, Princeton, N.J.

[22] Filed: Oct. 25, 1973

[21] Appl. No.: 409,580

[52] U.S. Cl. .............................. 350/160 R; 136/137
[51] Int. Cl.² ............................................ G02F 1/23
[58] Field of Search ................. 350/160 R; 136/182

[56] References Cited
UNITED STATES PATENTS

| | | |
|---|---|---|
| 3,521,941 | 7/1970 | Deb et al. ........................ 350/160 R |
| 3,708,220 | 1/1973 | Meyers et al. .................. 350/160 R |

*Primary Examiner*—Edward S. Bauer
*Assistant Examiner*—Wm. H. Punter
*Attorney, Agent, or Firm*—Joel F. Spivak

[57] ABSTRACT

An electrochromic device comprises, in a layered structure, a first electrode, an electrochromic material, an electrolyte and a back electrode which is of a material different than said first electrode. The device is characterized as having a nonlinear voltage response, a well defined threshhold, and an internal electromotive force which is uniquely determined by the color state of the device.

3 Claims, 2 Drawing Figures

NONLINEAR ELECTROCHROMIC DEVICE

BACKGROUND OF THE INVENTION

This invention relates to electrooptical devices, and more particularly to devices wherein the electromagnetic radiation transmission characteristics may be reversibly altered by a suitably controlled electric field.

The present invention provides an electrochromic device wherein the change of color only occurs above a certain applied threshold voltage. The electrochromic cell is analogous to a battery in that it is an electrolytic device which generates an internal electromotive force which is uniquely determined by the color state of the device. That is, the EMF that can be measured across the cell at any given time is dependent upon the color state and degree of coloration of the device. For a particular device, it is possible to make the EMF in the colored state sufficiently different from the EMF in the uncolored state so as to allow electronic sensing of the color and hence digital programing of the device. This novel device has the additional characteristic that its response to an applied field is nonlinear in nature. The aforementioned characteristics of the device makes the device suitable not only as an electrochromic display device but also as both a light addressable and electrically adressable memory element.

The prior art devices such as the one described by S. K. Deb et al. in U.S. Pat. No. 3,521,941 differs from the novel device in that it is not an electrolytic device and does not generate an EMF which is uniquely determined by the color state. It further differs in structure from the novel device in that the novel device does not contain a current carrier permeable insulator as described in Deb et al.

While the structure of the novel device is similar to that described by Meyers in U.S. Pat. No. 3,708,220, the examples of the device as set forth in Meyers do not exhibit a unique threshold which is determined by the color state of the device nor is the device as particularly described in Meyers a nonlinear device.

SUMMARY OF THE INVENTION

An electrochromic device comprises in a layered structure, a first electrode, an electrochromic material, an electrolyte and a back electrode which is of a material different from said first electrode, said device being characterized by having a nonlinear voltage response, a well-defined threshold, and an internal electromotive force which is uniquely determined by the color state of the device.

DETAILED DESCRIPTION OF THE INVENTION

The novel device is an electrochromic device which changes from a first color state to a second color state upon the application of a voltage across an electrochromic cell. The threshold voltage of such a device is defined herein as that voltage required to keep the device in any particular color state. The threshold voltage is equal to the internal EMF of the cell for that particular color state.

Figure 1:
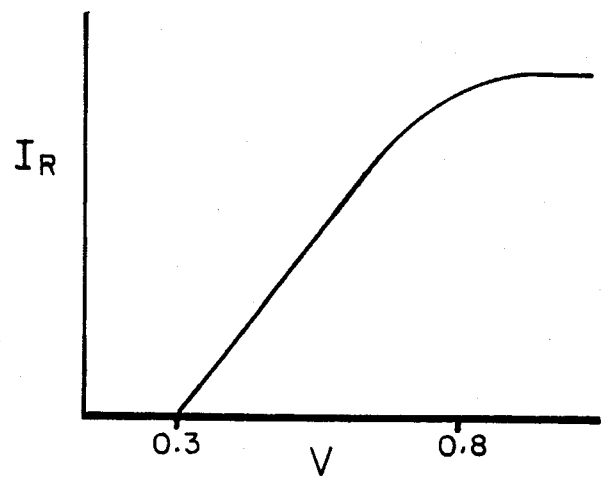
FIG. 1 is a graphical representation of the internal voltage of the novel device vs. the contrast ratio of the device as measured by means of the intensity of reflective light.

The nonlinearity of the device can be seen with reference to FIG. 1 which shows the internal voltage vs. the contrast ratio of a typical device as measured by means of the intensity of reflected light from an area of the device which has been colored as opposed to the intensity of the reflected light from an area of the device which is in is original, typically uncolored state. The figure indicates a minimum internal EMF when the device is in its first absorption state which internal EMF rises as the color of the device changes until an almost maximum internal EMF is achieved at a particular absorption level after which is essentially very little change in the internal EMF.

Figure 2:
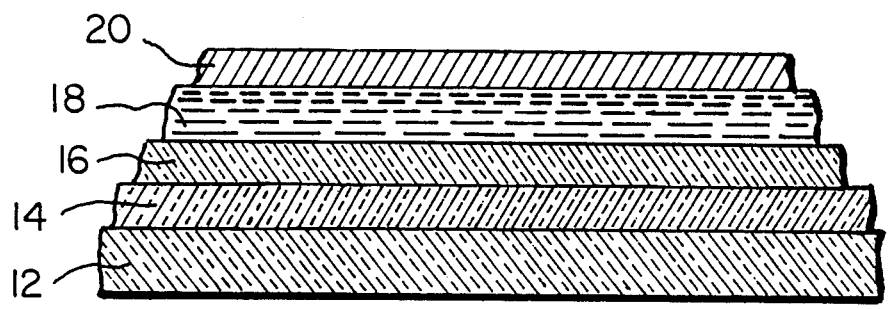
FIG. 2 is an elevational cross-sectional view of an embodiment of the novel device.

A particular embodiment of the device is shown in FIG. 2. Referring to FIG. 2 there is shown a glass substrate 12 having a transparent front electrode 14 thereon such as tin oxide. An electrochromic layer 16 is contiguous with the tin oxide and an electrolyte layer 18 lies over the electrochromic layer 16. On top of the electrolyte layer 18 there is a back electrode 20. While the general structure is similar to the device as shown in Meyers, the particular novel device arises out of the selection of the electrode materials so as to result in an electrolytic cell which generate an internal EMF as hereinbefore stated. An example of a preferred cell is one which may be designated as follows: $Pb/H_2SO_4/WO_3/TIC$ In the operation of any electrolytic device, the internal EMF is determined by the half cell reactions taking place at both electrodes. It is well known that the magnitude of the half cell voltages varies widely from one material to another. An electrolytic cell to be useful as an electrochromic device must have the properties of color reversibility and it must have a well-defined EMF in each color state in order to properly control the device.

For example, in the cell described above, employing a lead back electrode, a maximum conductivity sulfuric acid solution (about 4 molar) and a vacuum evaporated tungsten oxide electrochromic layer on a transparent conductive tin oxide front electrode, at room temperature, the tin oxide electrode is about 0.8 volts positive with respect to the lead electrode when the cell is colorless. When the cell is in a deeply colored state so as to be practical and useful for display purposes, the tin oxide electrode is only 0.3 volts positive with respect to the lead electrode. These values are slightly dependent upon the electrolyte concentration as well as the temperature of the cell. The device can be switched from one color state to another by driving current through the cell. For example, when the threshold voltage is applied to a clear cell such that the external voltage equals the internal EMF no current will be observed to flow and the color state will not change. As a voltage greater than the threshold voltage is applied, a small amount of current will flow but the device will remain clear. If, however, a voltage less than the threshold is applied or the cell is shorted, current will flow due to the cell's own EMF and the cell will turn color. The threshold voltage is different for each color state of the device and the device can achieve any color between a clear state and its colored state of saturation.

When the device is at a color state other than the clear state, the application of an external voltage equal to the threshold voltage for that particular color state which is applied opposite to the EMF of the cell will balance the EMF such that no current will flow and no color change will be produced. In this condition, the color of the cell is said to be persistent. In the absence of an applied voltage, there may be some leakage of current within the cell so as to alter somewhat the original color state of the cell. If a voltage is applied which is greater than the threshold voltage required to balance the internal EMF of the cell and the cell is initially colored, a color reversal will be achieved, that is the cell will become bleached until the cell reaches a color state at which the internal EMF is equal to but opposite the applied external voltage. If the external EMF is greater than the steady state EMF of the bleached cell, the internal EMF will initially be greater than the steady state EMF (0.80 in the case of the cell shown) upon removal of the external voltage and will then relax to the steady state valve.

Where the device is to be used as a display device for portraying specified patterns, either or both of the electrodes may be patterned in a manner so as to form the desired pattern. For example the electrodes may be segmented so as to form an alphanumeric display as is well-known in the art. In addition, the electrodes may be formed in rows and columns so as to comprise an xy matrix type display which is also well-known in the art and need not be specifically described herein.

The materials which form the electrochromic materials of the device in general are electrical insulators or semiconductors. Thus are excluded those metals, metal alloys and other metal containing compounds which are relatively good electrical conductors.

Useful electrochromic materials which generally exhibit electrochromism over a wide temperature range, e.g. minus 50° C to 125°C had been disclosed in Deb et al. and include but are not limited to, for example, tungsten oxide, molybdenum oxide, vanadium oxide, niobium oxide, tantalum oxide and uranium oxide. Tungsten oxide is generally preferred.

The front electrode can be any transparent conductive electrode such as conductive tin oxide or conductive indium oxide but must also provide a half cell reaction with the electrochromic layer such that its half cell reaction and the half cell reaction between the back electrode and the electrolyte solution give rise to a substantial internal EMF.

The back electrode should not be readily soluble in the electrolyte solution but should provide an EMF related to a half cell reaction between the electrolyte and the back electrode. The electrolyte solution must be one that forms a half cell couple with a back electrode and must be substantially conductive.

While the example describes the device employing a lead back electrode and sulfuric acid electrolyte and the tungsten oxide electrochromic layer with a tin oxide front electrode, it should be understood that the novel device is not limited to these combinations. Generally one can look to a typical battery cell in order to find electrolyteback electrode half cells which are suitable in the novel device. These include not only acid cells but alkaline cells as well. The only limitation is that the EMF of the particular half cell reaction of the battery couple employed in electrochromic cell should be sufficiently different than the EMF of the half cell reaction of the electrochromic materialfront electrode couple so as to produce a substantial internal EMF for the electrochromic cell which is stable and reproduceable and which is dependent upon the particular color state of the electrochromic material.

We claim:

1. An electrochromic device comprising a transparent conductive first electrode selected from the group consisting of tin oxide and indium oxide, a film of an electrochromic oxide on said electrode, an acidic electrolyte layer which is not reactive with said electrochromic film over said electrochromic film, and a lead electrode over said electrolyte layer, said device having an internal EMF which is measured by the color state of the electrochromic layer.

2. The device recited in claim 1 wherein said electrochromic oxide is tungsten oxide and wherein said acidic electrolyte is sulfuric acid.

3. The device recited in claim 2 wherein said sulfuric acid is in a concentration of about 4 molar.

\* \* \* \* \*